United States Patent
Kraft et al.

(10) Patent No.: US 8,312,373 B2
(45) Date of Patent: Nov. 13, 2012

(54) APPARATUS, METHOD, AND COMPUTER PROGRAM PRODUCT FOR AFFECTING AN ARRANGEMENT OF SELECTABLE ITEMS

(75) Inventors: Christian Kraft, Frederiksberg (DK); Peter Dam Nielsen, Kgs. Lyngby (DK); Gregory Steeves, Hants (GB); Simon Quainton, Hampshire (GB); Andrew Bick, Dorset (GB)

(73) Assignee: Nokia Corporation, Espoo (FI)

( * ) Notice: Subject to any disclaimer, the term of this patent is extended or adjusted under 35 U.S.C. 154(b) by 882 days.

(21) Appl. No.: 11/874,537

(22) Filed: Oct. 18, 2007

(65) Prior Publication Data

US 2009/0106694 A1   Apr. 23, 2009

(51) Int. Cl.
G06F 3/01   (2006.01)
G06F 3/00   (2006.01)

(52) U.S. Cl. ........................ 715/702; 715/744
(58) Field of Classification Search .................. 715/702, 715/744
See application file for complete search history.

(56) References Cited

U.S. PATENT DOCUMENTS

| | | | | |
|---|---|---|---|---|
| 5,128,672 | A * | 7/1992 | Kaehler | 341/23 |
| 5,748,512 | A * | 5/1998 | Vargas | 708/142 |
| 6,259,436 | B1 * | 7/2001 | Moon et al. | 345/173 |
| 6,310,610 | B1 | 10/2001 | Beaton et al. | |
| 6,611,258 | B1 | 8/2003 | Tanaka et al. | |
| 7,151,530 | B2 * | 12/2006 | Roeber et al. | 345/168 |
| 7,401,300 | B2 * | 7/2008 | Nurmi | 715/866 |
| 2002/0149569 | A1 * | 10/2002 | Dutta et al. | 345/173 |
| 2005/0071778 | A1 * | 3/2005 | Tokkonen | 715/822 |
| 2005/0154798 | A1 * | 7/2005 | Nurmi | 710/1 |
| 2005/0206730 | A1 * | 9/2005 | Hagiwara | 348/169 |
| 2006/0228149 | A1 | 10/2006 | Harley | |
| 2007/0152980 | A1 * | 7/2007 | Kocienda et al. | 345/173 |
| 2008/0266261 | A1 * | 10/2008 | Idzik | 345/168 |
| 2009/0106694 | A1 * | 4/2009 | Kraft et al. | 715/815 |
| 2011/0115710 | A1 * | 5/2011 | Fyke | 345/169 |

FOREIGN PATENT DOCUMENTS

WO   WO 99/28811 A1   6/1999

OTHER PUBLICATIONS

SofType On-Screen Keyboard for Windows Origin Instruments Company retrieved from archive.org dated Nov. 7, 2001 6 pages.*
Fitrianie, S., Rothkrantz, L.J.M. An Adaptive Keyboard with Personalized Language-Based Features TSD 2007, LNAI 4629, pp. 131-138 retrieved from Springerlink with published date of Aug. 19, 2007.*
PCT Search Report and Written Opinion for PCT/IB2008/054153 dated Feb. 17, 2009.
Office Action for Russian Application No. 2010119418/08(027616) dated Jul. 5, 2011.

* cited by examiner

*Primary Examiner* — William Bashore
*Assistant Examiner* — Andrea Long
(74) *Attorney, Agent, or Firm* — Alston & Bird LLP (57) ABSTRACT

Provided is an apparatus that includes a processing unit configured to monitor a quality of user performance in selecting one or more selectable items that are presented on a display. The processing unit is further configured to cause the one or more selectable items to be presented on the display in a modified arrangement based at least in part on the quality of user performance in respectively selecting the one or more selectable items. For example, the processing unit can be configured to cause the selectable items to be presented in a modified arrangement based at least in part on noted frequency of user error in respectively selecting the selectable items and/or on noted rate of user selection in respectively selecting the selectable items. Also provided are corresponding methods and computer program products.

17 Claims, 7 Drawing Sheets

APPARATUS, METHOD, AND COMPUTER PROGRAM PRODUCT FOR AFFECTING AN ARRANGEMENT OF SELECTABLE ITEMS

FIELD OF THE DISCLOSURE

Embodiments of the present invention relate generally to user interface technology and, more particularly, relate to a method, apparatus, and computer program product for displaying selectable items in a modified arrangement based on user performance in selecting the selectable items.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In many situations, it may be desirable for the user to interface with a device such as a mobile terminal for the provision of an application or service. Some users may have a preference for use of a touch screen display for entry of user interface commands over other alternatives, and in recognition of the utility and popularity of touch screen displays, many devices, including some mobile terminals, now employ touch screen displays. Other users may prefer to utilize other user interfaces, such as trackballs, mice, soft keys, keyboards, and/or keypads.

Regardless of the user interface being employed, users may encounter issues in entering information and commands into mobile devices, due, for example, to the small dimensions typically associated with mobile devices, or to the need to use such devices while moving or performing other tasks, or both. For example, users may find it difficult to accurately strike or select the relatively small keys of the keyboard/keypad associated with the mobile device. Users may also have difficulty selecting menu items or icons either from a touch screen display or via a mouse/trackball. Users may attempt to avoid these accuracy problems by reducing the rate at which information and/or commands are entered, but this may reduce productivity to an unacceptably low level.

Accordingly, it may be desirable to provide a mechanism that may overcome at least some of the disadvantages discussed above.

BRIEF SUMMARY

In one aspect, an apparatus is provided that includes a processing unit configured to monitor a quality of user performance in selecting one or more selectable items that are presented on a display. The processing unit is further configured to cause the one or more selectable items to be presented on the display in a modified arrangement based at least in part on the quality of user performance in respectively selecting the one or more selectable items. For example, the processing unit may be configured to cause a size of at least one of the selectable items to be modified based at least in part on the quality of user performance in selecting the selectable item. A graphical display region may be displayed simultaneously with the selectable items, with the processing unit being configured to cause a size of the graphical display region to be modified inversely with the size of the selectable items.

The processing unit can be configured to cause the selectable items to be presented in a modified arrangement based at least in part on noted frequency of user error in respectively selecting the selectable items. Alternatively, or in addition, the processing unit can be configured to cause the selectable items to be presented in a modified arrangement based at least in part on noted rate of user selection in respectively selecting the selectable items. The manner in which the size and/or configuration of the selectable items is modified may also depend on either or both of the other applications being executed by the apparatus and limits established by the user.

In one embodiment, the apparatus may further include a touch screen. The processing unit can then be configured to cause the selectable items to be presented on the touch screen, to monitor a quality of user performance in manually selecting the selectable items from the touch screen, and to cause the selectable items to be presented on the touch screen in a modified arrangement based at least in part on the quality of user performance in respectively manually selecting the selectable items.

In another aspect, a method is provided that includes providing one or more selectable items for display. A quality of user performance in selecting the selectable items is monitored, and the selectable items are automatically displayed in a modified arrangement based at least in part on the quality of user performance in respectively selecting the selectable items.

In yet another aspect, a computer program product is provided that includes a computer-readable storage medium having computer-readable instructions stored therein. The computer-readable instructions include first instructions for providing one or more selectable items for display. Also included are second instructions for monitoring a quality of user performance in selecting the selectable items. The computer-readable instructions further includes third instructions for automatically modifying an arrangement of the one or more selectable items based at least in part on the quality of user performance in respectively manually selecting the selectable items.

In still another aspect, an apparatus is provided that includes means for monitoring a quality of user performance in selecting one or more selectable items that are presented on a display. The means is further configured to cause the selectable items to be presented on the display in a modified arrangement based at least in part on the quality of user performance in respectively selecting the selectable items.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1A:
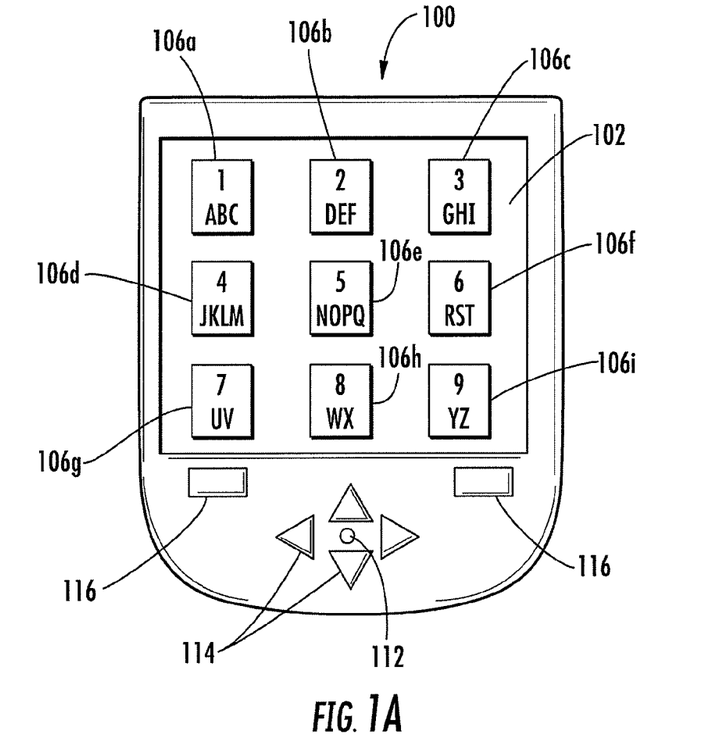
FIG. 1A is a plan view of an apparatus configured in accordance with an exemplary embodiment.
Figure 1B:
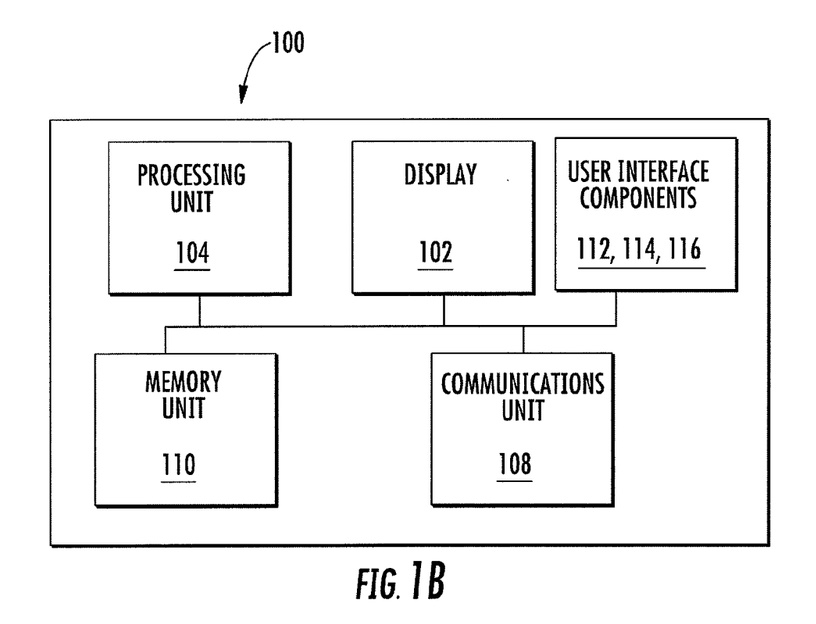
FIG. 1B is a block diagram of an apparatus configured in accordance with an exemplary embodiment.

Referring to FIGS. 1A and 1B, therein is shown an apparatus 100, configured in accordance with an exemplary embodiment. In the illustrated embodiment, the apparatus 100 is a personal digital assistant (PDA), but it is noted that the apparatus can be any type of communications and/or data device, such as, for example, a mobile terminal (a PDA, a cellular telephone, a pager, a laptop computer, and the like) or a stationary terminal such as a desktop computer. The PDA 100 may include a display 102, such as a liquid crystal display, and means, such as a processing unit 104, that is configured to cause one or more selectable items 106a-i to be presented on the display, for example, as a user interface. The processing unit 104 may be, for example, a microprocessor, an application specific integrated circuit, and/or the like. The mobile terminal 100 may also include a communications unit 108, such as a transceiver, a wireless transceiver, and/or the like, and a memory unit 110, such as a random access memory, a read-only memory, and/or the like.

The selectable items 106a-i may include, for example, alphanumeric keys, menu items, drop down menus, scroll bars, and/or the like. These "selectable items" may therefore be chosen or selected in some way that results in a response by the PDA 100. For example, where the selectable item 106 is a numerical key, selection of the key may prompt the PDA 100 to note the number associated with the key in the memory unit 110 or to display the number on the display 102. Alternatively, where the selectable item 106 is a menu item, selection of the item may cause the PDA 100 to provide a different (and presumably related) menu.

The manner in which the selectable items are selected or chosen may depend on the nature of the display 102. For example, the display 102 may be a standard monitor, in which case the selectable items 106a-i may be icons that are displayed on the monitor and selectable, for example, via a pointing device of the mobile terminal 100, such as a mouse. Alternatively, the display 102 may be a touch screen, in which case the selectable items 106a-i may be keys or buttons that are provided for manual selection (with, say, a finger, a stylus, or a pen) on a pressure-sensitive display panel.

The processing unit 104 can be configured to monitor a quality, or in some cases multiple qualities, of user performance in selecting the selectable items 106 that are presented on the display 102. A quality of user performance may be any indicator of a user's ability to successfully select a selectable item 106 that has been targeted or intended for selection by the user. For example, one possible measure of a quality of user performance might be a frequency of user error (or a user's "error rate") in respectively selecting the one or more selectable items. This could be determined, for example, by monitoring the number of times that a selection is followed by an action to undo the prior selection (e.g., using a "BACK" button when browsing menus or deleting an entered character) which could serve as a proxy for "wrong" or erroneous selections. This could alternatively be determined, for example, by monitoring unsuccessful user selection attempts, such as mouse clicks or contact events by a finger or stylus on a touch screen that do not result in the selection of any selectable items. Another possible measure of a quality of user performance might be a rate of user selection in respectively selecting the one or more selectable items, i.e., the rate at which a user selects consecutive selectable items.

Regardless of the measure of performance quality that is utilized, the monitoring of the quality of user performance can result in the production of noted indications of the performance quality. For example, the noted indications could be, for example, parameters outputted by the processor in monitoring user performance quality in order to quantify the monitored quality, such as an indication that a user has averaged 5 errors each minute over the last 5 minutes. The processing unit 104 can then be configured to cause the selectable items 106a-i to be presented on the display 102 in a modified arrangement based at least in part on the noted indications of the quality of user performance. In some embodiments, this modified arrangement may be designed to result in subsequent improved quality of user performance in selecting the selectable items 106a-i. As such, in some cases, the overall user interface may adapt to the abilities of the user.

Referring to FIGS. 1B and 2A-H, the processing unit 104 can be configured to implement the modification of the arrangement of the selectable items 206 in various ways. The selectable items 206 may start out with a default arrangement and/or size (see, e.g., FIG. 2A). In some cases, as a result of noted indications of user performance quality, all of the selectable items 206 may change size uniformly, e.g., increase in area (see, e.g., FIG. 2B). Alternatively, one selectable item 206*f* (or perhaps several) may change size while the other selectable items 206 remain unchanged (see, e.g., FIG. 2C). As another alternative, the selectable items 206 may change size in a non-uniform but interrelated manner, such as by increasing size in greater amounts with increasing distance from a certain portion of the display 202 (see, e.g., FIG. 2D, where the item 206*a* is the smallest, items 206*b,d*, and *e* adjacent to item 206*a* are larger, and items 206*c,f*, and *g-i*, being one step further removed from item 206*a*, are still larger). As still another alternative, the sizes of the selectable items 206 may change in a manner that is both non-uniform and for which the respective changes in size are not interrelated (see, e.g., FIG. 2E).

Figure 2A:
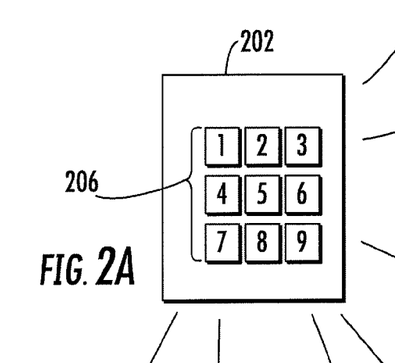
FIGS. 2A-H are plan views of a display including selectable items in various arrangements, the views together demonstrating various manners in which the arrangement of selectable items may be altered in accordance with exemplary embodiments.
Figure 2B:
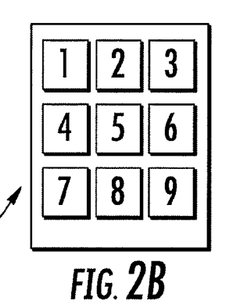
Figure 2C:
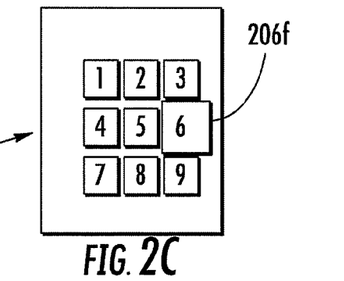
Figures 2D, 2E, 2F:
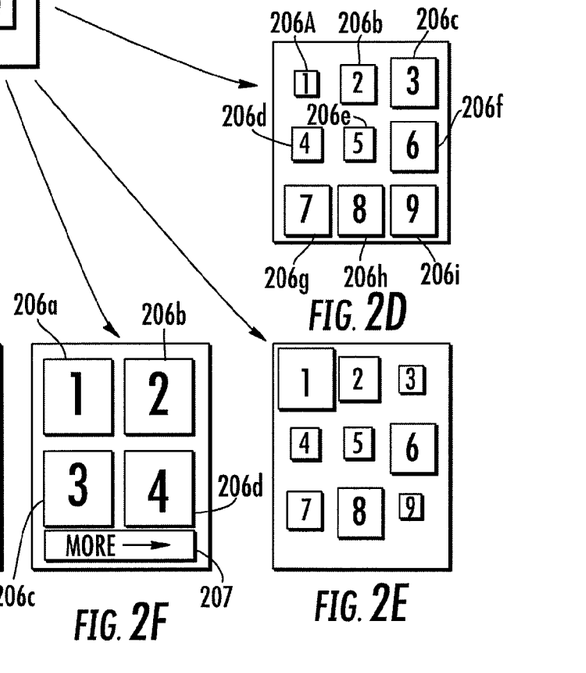
Figure 2G:
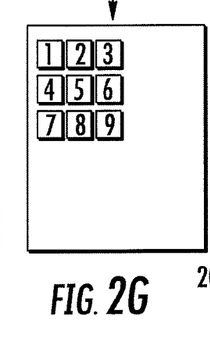
Figure 2H:
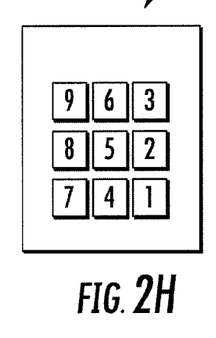

In some cases, the selectable items 206 may increase in size to a point where only a subset of the originally displayed items can be accommodated in the display 202 (see, e.g., FIG. 2F). A separate selectable item (e.g., a button or icon 207 indicating "MORE") can then be included to represent and provide access to non-displayed items. In some embodiments, the positions of one or all of the selectable items 206 may translate relative to the display 202 (see, e.g., FIG. 2G). In other embodiments, the selectable items 206 may be reordered within the display 202 (see, e.g., FIG. 2H). In some embodiments, two or more of these modification schemes may be implemented together. Further, the arrangement of the selectable items 206 may be additionally modified based on factors other than the quality of user performance in selecting the selectable items.

Referring to FIGS. 1A, 1B, 3A-C, and 8, therein is shown an example of a manner in which the arrangement of selectable items 306 may be altered. The selectable items 306 may, for example, be the keys of a numeric or alphanumeric keypad on a touch screen display 302, the display 302 also providing a graphical display region 312. The keys 306 may, for example, be provided (Block 802) in a default arrangement within the display 302 (FIG. 3A), the default arrangement, for example, being generated by a processing unit 104 associated with the apparatus 100. A quality of user performance in selecting one or more of the keys 306, such as the user error rate, may be monitored (Block 804), for example, by the processing unit 104.

Figure 3A:
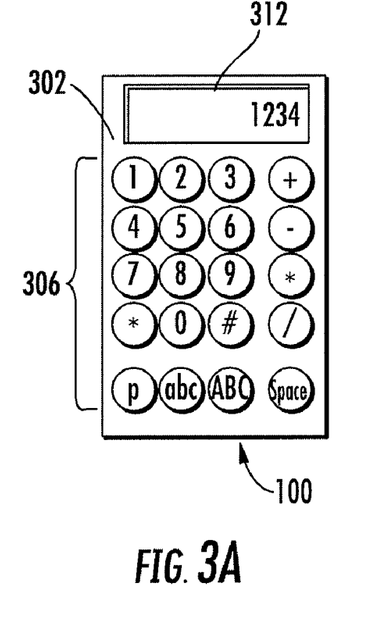
FIGS. 3A-C are plan views of a display including selectable items in various arrangements, the views together demonstrating one manner in which the arrangement of selectable items may be altered in accordance with an exemplary embodiment.
Figure 3B:
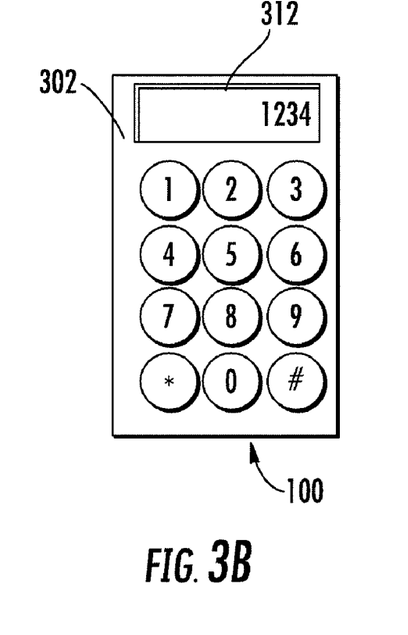
Figure 3C:
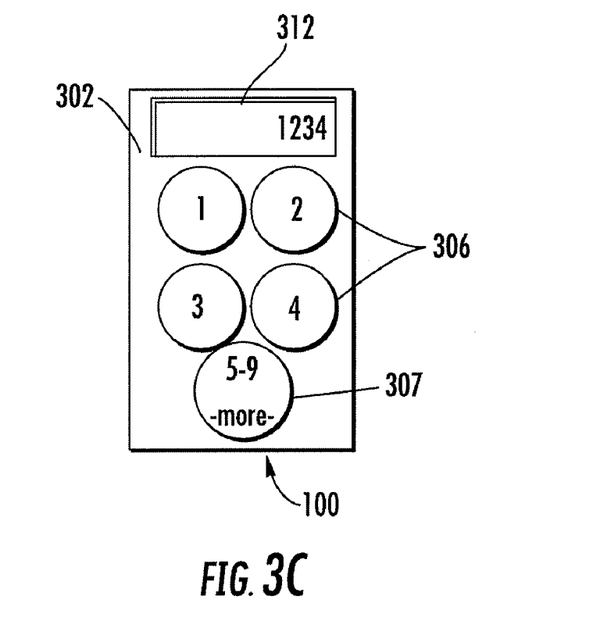

Based at least in part on the quality of user performance, the selectable items can be automatically displayed (e.g., in the display 302) in a modified arrangement with respect to the initial or prior arrangement (Block 806). For example, as a result of a significant user error rate in selecting one or more of the keys 306, the size of the keys may be increased (FIG. 3B). At the same time, some keys 306 (i.e., the "+", "−", "*", "/", "p", "abc", "ABC", and "space" keys of FIG. 3A) may be excluded from the display 302 in order to accommodate the increase in size. If user errors persist, the sizes of the various keys 306 may be increased further (FIG. 3C). The display 302 may then include a selectable item that provides access to the excluded keys, such as a button 307 or a scroll bar. Alternatively, the apparatus 100 may include user interface components, such as a trackball 112, directional buttons 114, soft keys 116, and/or the like, that allows the keys/items visualized in the display 302 to be scrolled or otherwise browsed. Once the arrangement of the selectable items has been modified, the process can be repeated and the arrangement again modified. This iterative process can be more or less continuous.

In some embodiments, the apparatus 100 (and specifically the processing unit 104) can be configured to cause the sizes of one or more of the selectable items 306 to be adjusted within limits selected by a user. For example, a user may set a lower limit for the size of any selectable item 306 based on, say, the size of the user's fingers, the type of implement that will be used to contact the selectable items, and/or the seeing ability of the user. The user may set an upper limit for the size of the selectable items that is based on, say, the minimum number of selectable items 306 that the user wishes to be displayed at one time. The apparatus 100 can also be configured to cause the sizes of the selectable items 306 to change size at a specified rate, such as, for example, an increase in size of 15% for every five minutes that includes 10 or more errors. In other cases, the apparatus 100 may be configured such that the sizes of the selectable items 306 may decrease in size, or may increase and subsequently decrease in size, for example, as user performance improves.

Figures 4A, 4B:
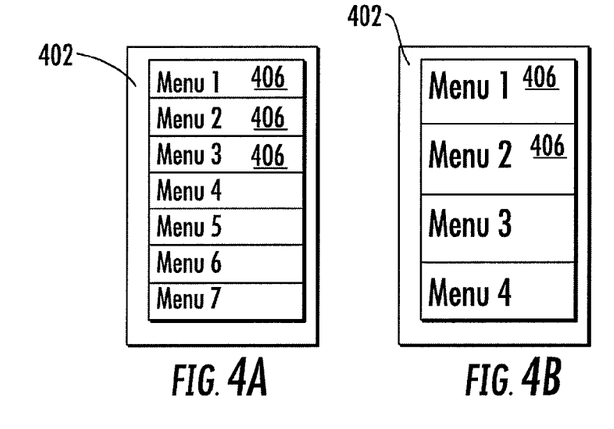
FIGS. 4A-C are plan views of a display including selectable items in various arrangements, the views together demonstrating another manner in which the arrangement of selectable items may be altered in accordance with an exemplary embodiment.
Figure 4C:
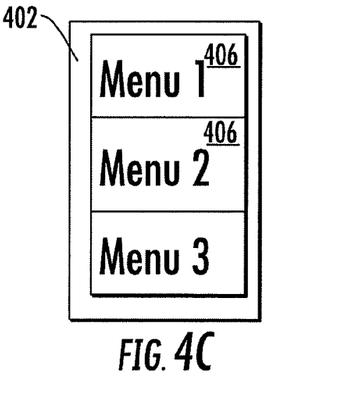

Referring to FIGS. 1B and 4A-C, therein is shown another example of the manner in which the arrangement of selectable items 406 may be altered. In this case, the selectable items 406 are menu items on display 402, for example, a touch screen display. As in the previously discussed embodiment, the menu items 406 may start out with a default arrangement within the display 402 (FIG. 4B). Based on some measure of the quality of user performance in choosing the menu items 406, the sizes of the menu items can be either increased (FIG. 4C) or decreased (FIG. 4A).

Figure 5A:
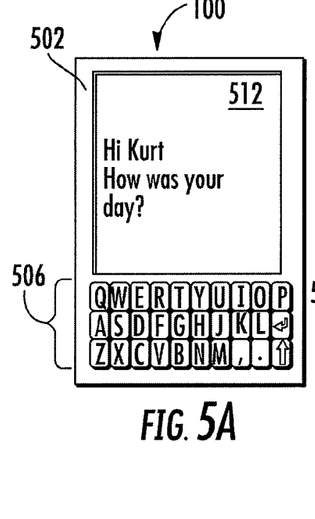
FIGS. 5A-C are plan views of a display including selectable items in various arrangements, the views together demonstrating yet another manner in which the arrangement of selectable items may be altered in accordance with an exemplary embodiment.
Figure 5B:
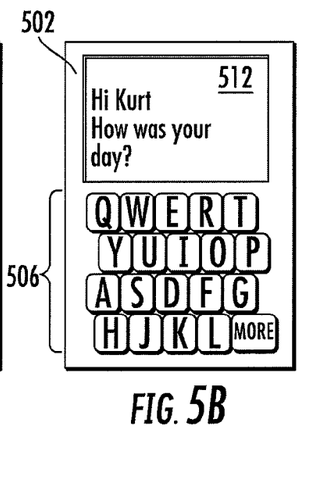
Figure 5C:
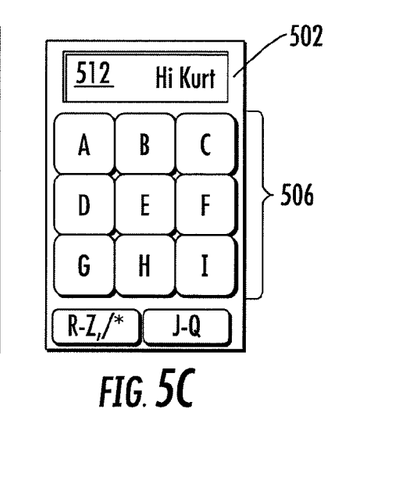

Referring to FIGS. 1B and 5A-C, therein is shown yet another example of the manner in which the arrangement of selectable items 506 may be altered. The apparatus 100 (e.g., the processing unit 104) can be configured to cause a graphical display region 512 to be displayed in the display 502 simultaneously with the selectable items 506, which in the illustrated embodiment are alphabetical keys. The graphical display region 512 could be used, for example, to display text messages received by the apparatus (e.g., via the communications unit 108) or to visualize user entries via the keys 506. The apparatus 100 can be further configured to apportion the area of the display 502 between the keys 506 and the graphical display region 512, such that a size (such as vertical height as shown in FIGS. 5A-C) of the graphical display region 512 varies inversely with the size of at least one of the keys 506. As discussed previously, the apparatus 100 can be configured to adjust the sizes of the keys 506 within limits established by a user, such that, for example, the size of the graphical display region 512 is not reduced to an uncomfortable or unusable size.

In some embodiments, the user may specify and adjust the order in which the keys 506 are excluded from and reintroduced into the display 502. For example, the keys 506 may start in a "typical keyboard configuration," as shown in FIG. 5A. As the sizes of the keys 506 are increased, the keys corresponding to the bottom row of the typical keyboard configuration may be removed, as shown in FIG. 5B, and the keys corresponding to the upper two rows of the typical keyboard configuration are reconfigured to fit within the space allotted for the keys. However, as the sizes of the keys 506 are further increased, the keys that remain displayed may be rearranged to be in alphabetical order rather than having some relationship to the initial placement in the typical keyboard configuration (FIG. 5C). Alternatively, the user may prefer to retain the relationship of the keys 506 to the typical keyboard configuration regardless of the sizes of the keys or the number of keys being displayed at one time.

Figure 6A:
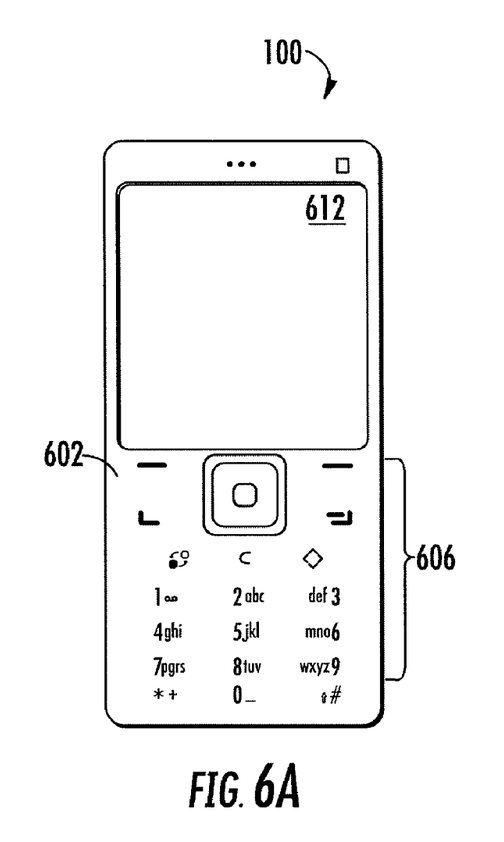
FIGS. 6A-C are plan views of a display including selectable items in various arrangements, the views together demonstrating still another manner in which the arrangement of selectable items may be altered in accordance with an exemplary embodiment.
Figure 6B:
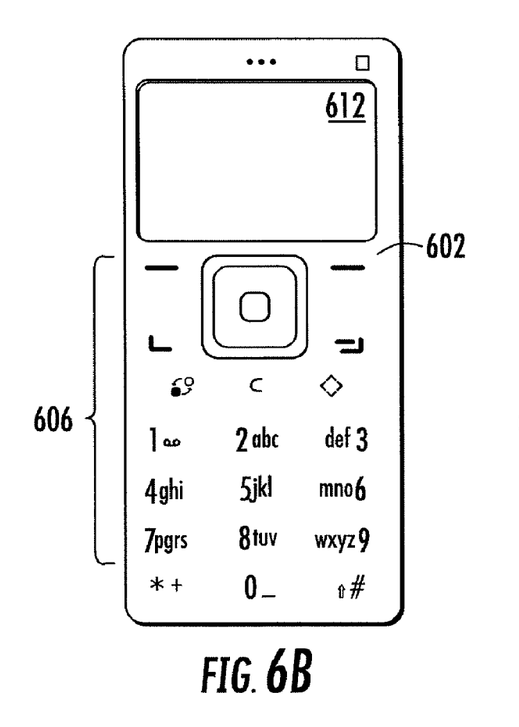
Figure 6C:
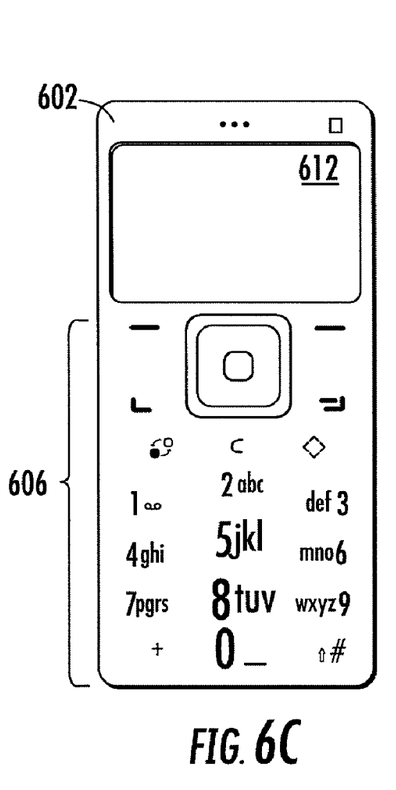

Referring to FIGS. 1B and 6A-C, therein is shown still another example of the manner in which the arrangement of selectable items 606 may be altered, this manner being a combination of several of the previously discussed rearrangement schemes. In this case, the apparatus 100 can be configured to cause a graphical display region 612 to be displayed in the display 602 simultaneously with selectable alpha-numeric keys 606, and to apportion the area of the display 602 between the keys 606 and the graphical display region 612. The display 602 may start out with an initial apportionment, as shown in FIG. 6A. Based on monitoring of the quality of user performance, a relatively high user error rate in selecting the keys 606 may be detected. As a result, the sizes of the keys may be increased, with the area of the graphical display region 612 being correspondingly decreased, as shown in FIG. 6B. Further monitoring may determine that the error rate in selecting many of the keys 606 is at an acceptable level (this level, for example, being predefined at the time of manufacture of the apparatus 100 or being user defined), but that the error rate associated with the selection of specific keys is unacceptably high. For example, it may be determined that the error rate associated with selecting the "5" key is moderately high, and that the respective error rates associated with selecting the "8" and "0" keys is extremely high. In response, the size of the "5", "8", and "0" keys can be increased relative to the sizes of the other keys, with the size of the "5" key being increased less than that of the "8" and "0". As such, the processor 104 may be configured to monitor the quality of user performance in selecting individual keys or items, as well as the overall performance in generally making selections.

Figure 7A:
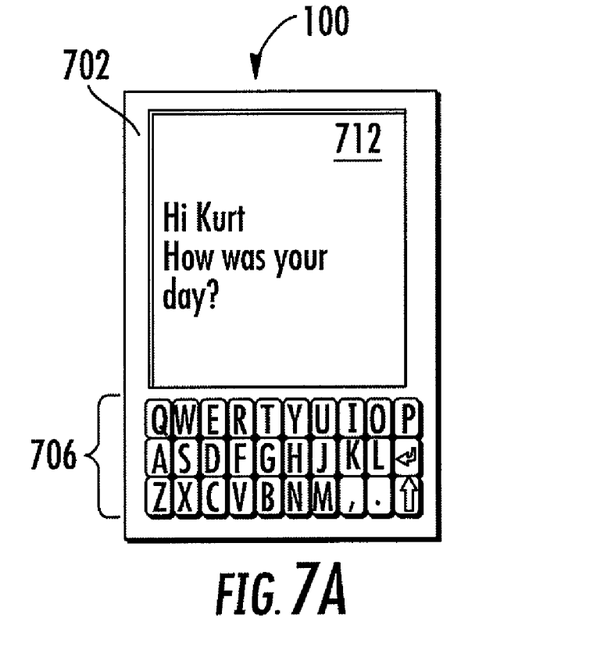
FIGS. 7A and B are plan views of a display including selectable items in various arrangements, the views together demonstrating yet another manner in which the arrangement of selectable items may be altered in accordance with an exemplary embodiment.
Figure 7B:
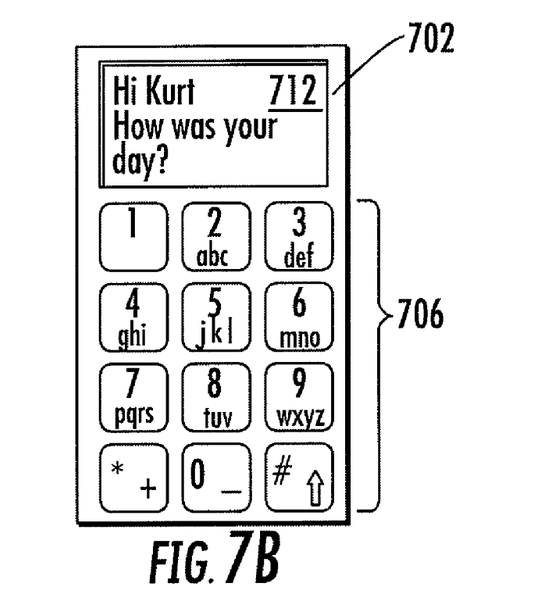
Figure 8:
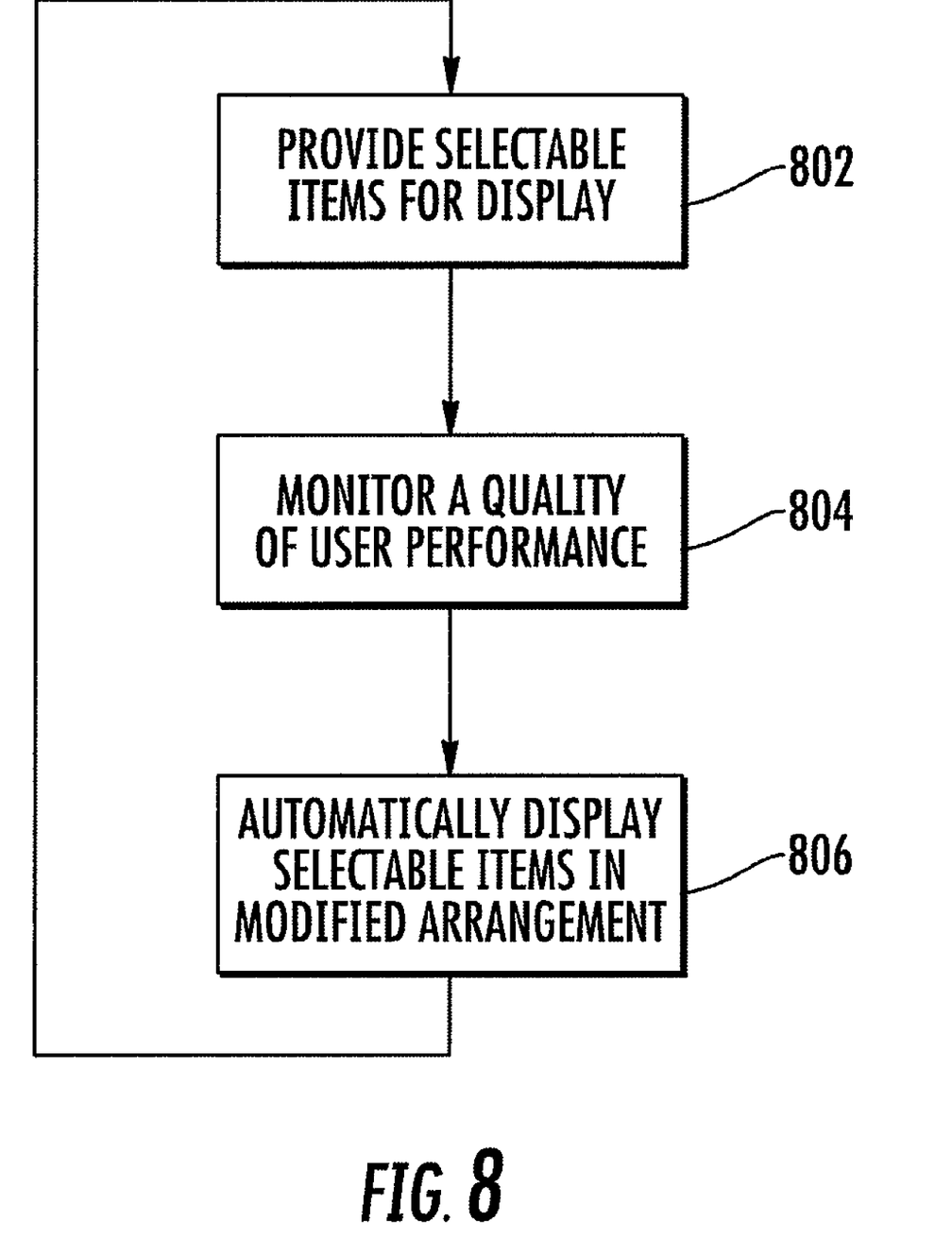
FIG. 8 is a flowchart representing a method for affecting the display arrangement of selectable items, the method being in accordance with an exemplary embodiment.

Referring to FIGS. 1B, 7A, and 7B, therein is shown yet another example of the manner in which the arrangement of selectable items 706 may be altered. The apparatus 100 (e.g., the processing unit 104) may be configured to select between multiple modes for displaying selectable keys 706, depending on the performance characteristics of the user. For example, a user that exhibits a high degree of accuracy in selecting the keys 706 may be provided a typical keyboard configuration in which all of the alphabetical keys are simultaneously displayed on a display 702, as shown in FIG. 7A. Alternatively, a user that exhibits a low degree of accuracy in selecting the keys 706 may be provided an alpha-numeric keypad arrangement, with larger, but less specific, keys (as in FIG. 7B). In some embodiments, the arrangement of keys may include several intermediate steps between a typical keyboard configuration and an alpha-numeric keypad, such as the configurations of FIGS. 5B and 5C. The conditions under which the mode of display will be changed can be selectable by a user. In other embodiments, the mode of display of the keys 706 and/or the modification of the arrangement of the keys may depend on the number, type, and/or identification of the applications that may be executing concurrently or in parallel on the apparatus 100. For example, when the apparatus 100 is running a graphics-intensive application, it may be desirable to maintain a minimum size for the graphical display region 712.

As described above and as will be appreciated by one skilled in the art, embodiments of the present invention may be configured as a system, an apparatus, or a method. Accordingly, embodiments of the present invention may be comprised of various means including entirely of hardware, entirely of software, or any combination of hardware and software. Furthermore, embodiments of the present invention may take the form of a computer program product on a computer-readable storage medium having computer-readable program instructions (e.g., computer software) embodied in the storage medium, e.g., memory device 110. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processing device 104, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, some embodiments may operate such that a display on which selectable items are displayed may be physically separate from a processor acting to cause a modification of the display arrangement. For example, the processor may be located in a computer that is connected to an associated display via a network, such as the Internet. Further, some embodiments may monitor unsuccessful user selection attempts and analyze the placement of such unsuccessful selections relative to the respective positions of any selectable items. As a result of this analysis, positions of one or more of the selectable items may be translated. That is, embodiments may analyze selection errors to determine that a user consistently selects just to one side of a selectable item, and may respond by moving that item sideways by an appropriate amount. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the at least one processor, direct the apparatus at least to:

monitor a quality of user performance in selecting one or more selectable items that are presented on a display;

cause the one or more selectable items to be presented on the display in a modified arrangement based at least in part on the quality of user performance in respectively selecting the one or more selectable items; and     cause the one or more selectable items to be presented in the modified arrangement based at least in part on an identification of one or more applications being concurrently executed on the apparatus;

wherein monitoring the quality of user performance in selecting one or more selectable items that are presented on the display includes monitoring unsuccessful selection attempts that do not result in a selection of any selectable items.

2. An apparatus according to claim 1, wherein the apparatus directed to cause the one or more selectable items to be presented on the display, the display being a touch screen;

wherein the apparatus being directed to monitor the quality of user performance includes being directed to monitor the quality of user performance in manually selecting the one or more selectable items from said touch screen; and     wherein the apparatus being directed to cause the one or more selectable items to be presented includes being directed to cause the one or more selectable items to be presented on the touch screen in a modified arrangement based at least in part on the quality of user performance in respectively manually selecting the one or more selectable items.

3. An apparatus according to claim 1, wherein the apparatus is further directed to cause a size of at least one of the one or more selectable items to be modified based at least in part on the quality of user performance in selecting the at least one of the one or more selectable items.

4. An apparatus according to claim 3, wherein the apparatus is further directed to:

cause a graphical display region to be displayed simultaneously with the one or more selectable items; and     cause a size of the graphical display region to be modified inversely with the size of the at least one of the one or more selectable items.

5. An apparatus according to claim 4, wherein the apparatus is further directed to cause the sizes of the graphical display region and the at least one of the one or more selectable items to be adjusted within limits selected by a user.

6. An apparatus according to claim 1, wherein the apparatus is further directed to cause the one or more selectable items to be presented in a modified arrangement based at least in part on noted frequency of user error in respectively selecting the one or more selectable items.

7. An apparatus according to claim 1, wherein the apparatus is further directed to cause the one or more selectable items to be presented in a modified arrangement based at least in part on noted rate of user selection in respectively selecting the one or more selectable items.

8. An apparatus according to claim 1, wherein the apparatus is further directed to cause the one or more selectable items to be presented in a modified arrangement based on the quality of user performance in respectively manually selecting the one or more selectable items and in a manner that is adjustable by the user.

9. A method comprising:

causing one or more selectable items to be displayed;

monitoring, by a processor, a quality of user performance in selecting the one or more selectable items;

causing automatic displaying of the one or more selectable items in a modified arrangement based at least in part on the quality of user performance in respectively selecting the one or more selectable items; and     causing the one or more selectable items to be presented in the modified arrangement based at least in part on an identification of one or more applications being concurrently executed;

wherein monitoring the quality of user performance in selecting one or more selectable items that are presented on the display includes monitoring unsuccessful selection attempts that do not result in a selection of any selectable items.

10. A method according to claim 9, wherein said causing automatic displaying of the one or more selectable items in the modified arrangement includes causing automatic displaying of the one or more selectable items in the modified arrangement based at least in part on noted frequency of user error in respectively selecting the one or more selectable items.

11. A method according to claim 9, wherein said causing automatic displaying of the one or more selectable items in the modified arrangement includes causing automatic displaying of the one or more selectable items in the modified arrangement based at least in part on noted rate of user selection in respectively selecting the one or more selectable items.

12. A computer program product comprising a computer-readable storage medium having computer-readable instructions stored therein, the computer-readable instructions comprising:

first instructions for causing one or more selectable items to be displayed;

second instructions for monitoring a quality of user performance in selecting the one or more selectable items;

third instructions for causing automatic modifying of an arrangement of the one or more selectable items based at least in part on the quality of user performance in respectively manually selecting the one or more selectable items; and     fourth instructions for causing the one or more selectable items to be presented in the modified arrangement based at least in part on an identification of one or more applications being concurrently executed;

wherein said second instructions for monitoring a quality of user performance in selecting the one or more selectable items include instructions for monitoring unsuccessful selection attempts that do not result in a selection of any selectable items.

13. A computer program product according to claim 12, wherein said third instructions include instructions for causing automatic modifying of an arrangement of the one or more selectable items based at least in part on noted frequency of user error in respectively selecting the one or more selectable items.

14. A computer program product according to claim 12, wherein said third instructions include instructions for causing automatic modifying of an arrangement of the one or more selectable items based at least in part on noted rate of user selection in respectively selecting the one or more selectable items.

15. An apparatus comprising:
means for monitoring a quality of user performance in selecting one or more selectable items that are presented on a display;
means for causing the one or more selectable items to be presented on the display in a modified arrangement based at least in part on the quality of user performance in respectively selecting the one or more selectable items; and
means for causing the one or more selectable items to be presented in the modified arrangement based at least in part on an identification of one or more applications being concurrently executed;
wherein said means for monitoring the quality of user performance in selecting one or more selectable items that are presented on the display include means for monitoring unsuccessful selection attempts that do not result in a selection of any selectable items.

16. An apparatus according to claim 15, wherein said means for causing the one or more selectable items to be presented includes means for causing the one or more selectable items to be presented in a modified arrangement based at least in part on noted frequency of user error in respectively selecting the one or more selectable items.

17. An apparatus according to claim 15, wherein said means for causing the one or more selectable items to be presented includes means for causing the one or more selectable items to be presented in a modified arrangement based at least in part on noted rate of user selection in respectively selecting the one or more selectable items.

* * * * *